United States Patent [19]

Chevillat et al.

[11] Patent Number: 5,784,415
[45] Date of Patent: Jul. 21, 1998

[54] ADAPTIVE NOISE-PREDICTIVE PARTIAL-RESPONSE EQUALIZATION FOR CHANNELS WITH SPECTRAL NULLS

[75] Inventors: Pierre Chevillat, Kilchberg; Evangelos Eleftheriou, Zurich; Dietrich Maiwald, Waedenswil, all of Switzerland

[73] Assignee: International Business Machines Corporation, Armonk, N.Y.

[21] Appl. No.: 491,977

[22] PCT Filed: Jun. 14, 1993

[86] PCT No.: PCT/EP93/01500

§ 371 Date: Jul. 20, 1995

§ 102(e) Date: Jul. 20, 1995

[87] PCT Pub. No.: WO94/29989

PCT Pub. Date: Dec. 22, 1994

[51] Int. Cl.⁶ .................... H03D 1/00; H03M 13/12
[52] U.S. Cl. ............. 375/341; 375/350; 371/43; 360/65
[58] Field of Search .................. 375/341, 290, 375/340, 346, 348, 262, 350, 263, 265, 285; 371/43; 360/65

[56] References Cited

U.S. PATENT DOCUMENTS 4,571,734  2/1986  Dolivo et al. ............... 375/18
4,888,779  12/1989  Karabed et al. ............. 371/43

OTHER PUBLICATIONS

Lou, H., "Implementing the Viterbi Algorithm", IEEE Signal Processing Magazine, pp. 42–52, Sep. 1995.

Forney, Jr., G.D., "The Viterbi Algorithm", IEEE Proceedings, Vol IT–61, No. 3 pp. 268–279, Mar. 1973.

*Primary Examiner*—Chi H. Pham
*Assistant Examiner*—William Luther
*Attorney, Agent, or Firm*—Jeanine S. Ray-Yarletts

[57] ABSTRACT

The present application makes use of a novel adaptive noise-predictive partial-response equalization scheme for channels (30) exhibiting spectral nulls and/or near nulls. The noise-predictive partial-response (PR) equalizer employed in the different embodiments of the present invention consists of a linear PR equalizer (32) which shapes the channel response to a predetermined partial-response function, followed by a linear predictor. This scheme modifies the output sequence of said linear partial-response equalizer (32) by whitening the total distortion, i.e. by whitening the noise components and the residual interference components at said linear PR equalizer output, thereby achieving the best possible signal-to-noise ratio (SNR) before detection.

10 Claims, 9 Drawing Sheets

ADAPTIVE NOISE-PREDICTIVE PARTIAL-RESPONSE EQUALIZATION FOR CHANNELS WITH SPECTRAL NULLS

TECHNICAL FIELD

The present invention concerns a method and apparatus for digital information transmission over channels with spectral nulls or near nulls, making use of a novel adaptive noise-predictive partial-response equalization scheme. Typical channels exhibiting spectral nulls or near nulls are wire transmission and magnetic recording channels.

BACKGROUND OF THE INVENTION

In many practical digital information transmission systems including magnetic recording systems, the frequency response of the channel exhibits spectral nulls and/or near nulls. For example, wire pair or twisted-pair subscriber loops terminated by transformers exhibit a spectral null at dc and strong attenuation at high frequencies, i.e. the corresponding frequency response 10 has a null at dc (f=0) and a near null at high frequencies, as shown in FIG. 1. The frequency response of the magnetic recording channel has similar characteristics due to the magnetic head. It is known in the art, that receivers which employ nonlinear decision-feedback equalizers (DFE) cope more effectively with channels having spectral nulls than receivers employing linear transversal Nyquist equalizers. Furthermore, a decision-feedback equalizer compensates more easily for the post-cursor intersymbol-interference (ISI) such as the one caused by the presence of bridged taps in the subscriber loop plant. Examples of test loops with bridged taps can be found in the American National Standard for Telecommunications "Integrated Services Digital Network (ISDN)—Basic Access Interface for Use on Metallic Loops for Application on the Network Side of the NT (Layer 1 Specification)", ANSI Document T1.601, 1988.

A multiplication-free compromise decision-feedback equalizer with fixed forward and adaptive feedback sections has been described in "Full-Duplex Data Over Local Loops", N.-S. Lin et al., IEEE Communications Magazine, Vol. 26, No. 2, pp. 31–42, 1988. Another decision-feedback equalizer whose coefficients are updated by the sign algorithm has been proposed in "A Long Reach Digital Subscriber Loop Transceiver", P. F. Adams et al., Br. Telecommunications Journal, Vol. 5, No. 1, pp. 25–31, 1987.

The application of adaptive decision-feedback equalization in the magnetic recording channel has been discussed in the tutorial article "Adaptive Equalization in Magnetic-Disk Storage Channels", J. M. Cioffi et al., IEEE Commmunications Magazine, Vol. 28, No. 2, pp. 14–29, 1990.

Linear partial response (PR) equalization followed by Viterbi detection is an alternative to DFE and symbol-by-symbol detection. A partial response maximum likelihood (PRML) system for the magnetic recording channel has been described in "A PRML System for Digital Magnetic Recording", R. D. Cideciyan et al., IEEE Journal on Selected Areas in Communications, Vol. 10, No. 1, pp. 38–56, January 1992.

In U.S. Pat. No. 4,571,734 with title "Method and Apparatus for Decoding the Output of a Partial-Response Signal of a Partial-Response Class-IV Communication or Recording Device Channel", issued 18 Feb. 1986, the implementation of PR Viterbi detectors for partial response systems is described.

In U.S. Pat. No. 5,031,195, with title "Fully Adaptive Modem Receiver Using Whitening Matched Filtering", issued 9 Jul. 1991, a modem (modulator-demodulator) receiver is disclosed which comprises a whitened-matched filter (WMF) 20, a Viterbi decoder 21, and an intersymbol interference (ISI) coefficient estimator 22, as illustrated in FIG. 2. Some details of the operation of said modem receiver when receiving TCM (Trellis Coded Modulation) signals are described below with reference to FIG. 2.

An analytic passband signal $y_k$, which is sampled with a sample rate s/T, is fed into said WMF 20. The WMF 20 mainly consists of a minimum mean-squared error linear equalizer 23, with fractional-T spaced coefficients $\{c_i\}$, whose output signal $z_k$ is input to multiplication means 26 for the correction of the carrier phase offset. The signal $z_k'$ after carrier phase offset correction is fed into a linear predictor 24. This linear predictor 24 is operated as a whitening filter by adding the predictor's output 25 signal $z_k''$ to $z_k'$. The resulting signal $v_k$ is fed to a Viterbi decoder 21 to determine the TCM encoded sequence $\{a_k\}$ and to make it available, after some delay $\delta$ at the output 27. The linear equalizer 23 first eliminates the ISI in a mean-squared error sense and the predictor 24 subsequently whitens the noise and the residual ISI components of the equalized output signal $z_k'$. It is mentioned in this U.S. patent that the WMF 20 can be made adaptive by updating the equalizer coefficients $\{c_i\}$ and predictor coefficients $\{p_i\}$ using the error signals $e_k'$ and $e_k$, respectively, as indicated by the dashed lines in FIG. 2. Both error signals are formed by using zero-delay tentative decisions $\hat{a}_k$ released by the Viterbi detector 21 at the output line 28. The prediction error $e_k$ is obtained using the ISI coefficient estimator 22 receiving said zero-delay tentative decisions $\hat{a}_k$.

This fully adaptive modem receiver is not suited for use in channels exhibiting spectral nulls or near nulls. The reason is that the linear equalizer 23 in FIG. 2 in its attempt to invert the channel frequency response, would lead to severe noise enhancement. Note that for channels with spectral nulls a linear equalizer optimized under a zero-forcing criterion cannot be defined, since inversion of a spectral null leads to an undefined operation.

Linear PR equalizers such as the ones described in the article "A PRML System for Digital Magnetic Recording", R. D. Cideciyan et al., IEEE Journal on Selected Areas in Communications, Vol. 10, No. 1, pp. 38–56, January 1992 alleviate the problem of inverting a spectral null. However, linear equalization leads to substantial noise-enhancement due to the mismatch between the actual channel frequency response characteristics 10 and the desired PR shape 11, in FIG. 1.

It is an object of the present invention to provide a method and apparatus for improving the performance of PR systems such as PR data transmission systems or PR magnetic recording systems.

It is an object of the present invention to provide a method and apparatus for improved and reliable transmission and detection of data over a channel exhibiting spectral nulls and/or near nulls.

It is another object of the present invention to provide a method and apparatus which can be employed in a conventional transmission system comprising a linear partial-response equalizer and a PR Viterbi detector to enhance performance.

SUMMARY OF THE INVENTION

The above objects have been accomplished by making use of a novel adaptive noise-predictive partial-response equalization scheme for channels exhibiting spectral nulls and near nulls. The noise-predictive partial-response (PR) equalizer employed in the different embodiments of the present invention consists of a linear PR equalizer which shapes the channel response to a predetermined partial-response function, followed by a linear predictor. In systems employing a PR Viterbi detector reliable operation is achieved by using decisions from the path memory of the Viterbi detector, i.e. by imbedding the prediction process into the Viterbi detector, thus obtaining a modified sequence estimator with PR Viterbi detector. This scheme modifies the output sequence of said linear PR equalizer by whitening the total distortion, i.e. by whitening the noise components and the residual interference components at said linear PR equalizer output, thereby achieving the best possible signal-to-noise ratio (SNR) before detection. The performance of conventional partial-response systems, e.g. of the magnetic recording system claimed in U.S. Pat. No. 4,571,734, can always be substantially improved by attaching said linear predictor.

Some conceptual aspects of the present invention, i.e. of the adaptive noise-predictive partial-response equalization scheme, have been published by the inventors themselves at the IEEE International Conference on Communications (ICC), 14 Jun. 1992 till 18 Jun. 1992, Chicago, Ill. The presentation took place on 15 Jun. 1992. A reprint of this presentation has been published by the IEEE Communications Society, 345 East 47th Street, New York, N.Y. 10017, U.S.A entitled "Noise-Predictive Partial-Response Equalizers and Applications", P. R. Chevillat, E. Eleftheriou, and D. Maiwald.

At this conference a receiver in a data transmission system for the reception of uncoded data sequences has been published, said receiver comprising the inventive noise-predictive partial-response equalizer. Said disclosed receiver consists of a PR shaping linear equalizer and a noise-whitening predictor. Reliable operation of this receiver is achieved by using in the predictor decisions from the path memory of a PR Viterbi detector. The text of the presentation, as it has been reprinted in "Noise-Predictive Partial-Response Equalizers and Applications", P. R. Chevillat, E. Eleftheriou, and D. Maiwald., by IEEE Communications Society, 345 East 47th Street, New York, N.Y. 10017, U.S.A., is made part of the detailed description.

DESCRIPTION OF THE DRAWINGS AND NOTATIONS USED

The invention is described in detail below with reference to the following drawings.

$x_k$ information or data symbol $\{x_k\}$ discrete time digital information sequence $x(D)$ D-transform representing $\{x_k\}$ $\tilde{x}_k(\mu_k)$ data symbol estimate taken from the path memory associated with state $\mu_k$

GENERAL DESCRIPTION

Figure 3:
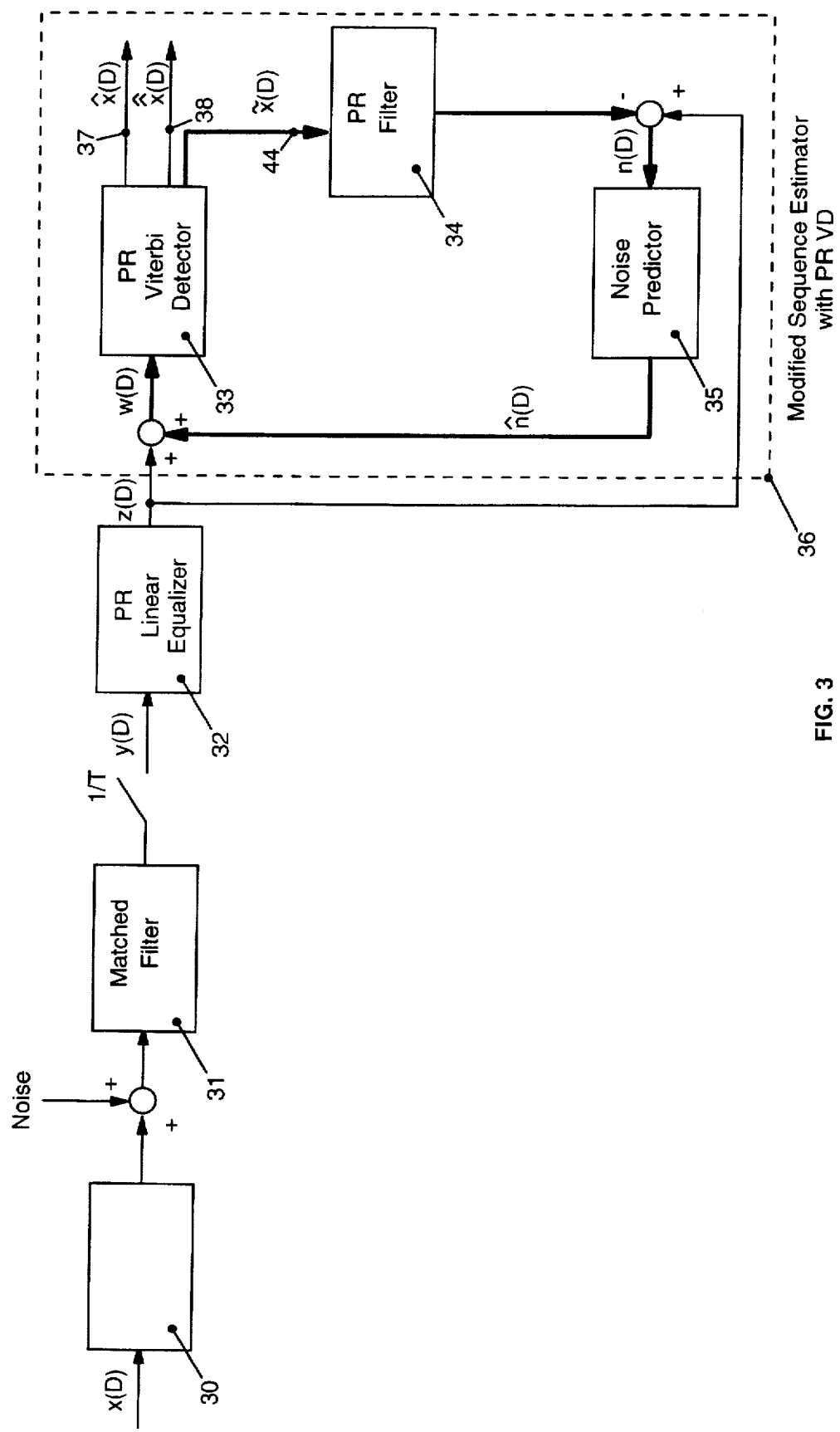
FIG. 3 shows a schematic block diagram of a data transmission system, in accordance with the first embodiment of the present invention, which has been derived from the data transmission system presented at the 1992 IEEE International Conference on Communications.

The first embodiment of the present invention which is based on the data transmission system disclosed at the 1992 IEEE International Conference on Communications is described in greater detail below, with reference to FIGS. 3–6. The relevant sections of the article "Noise-Predictive Partial-Response Equalizers and Applications", of P. R. Chevillat, E. Eleftheriou, and D. Maiwald., reprinted by IEEE Communications Society, 345 East 47th Street, New York, N.Y. 10017, U.S.A., have been incorporated, accordingly. The inventive noise-predictive partial-response equalizer, as part of a receiver of a digital information transmission system, is illustrated in FIG. 3.

Let the data symbol $x_k$ take on values from an equally spaced M-level alphabet as for example: $\pm 1, \pm 3, \pm(M-1)$ if M is an even number, and $0, \pm 2, \pm(M-1)$ if M is an odd number. The M-ary digital information sequence $\{x_k\}$ transmitted via the channel 30 is represented by the D-transform $x(D)=\Sigma_k x_k D^k$. The transmitted digital information sequence is assumed to be uncorrelated with average symbol energy $\sigma_x^2$ and symbol rate 1/T. The inventive receiver observes a signal emerging from a linear dispersive channel which adds white Gaussian noise. The discrete-time channel autocorrelation coefficients are denoted by $R_h(k)$, and the power spectral density of the additive noise is $N_0$. After symbol-rate sampling (sample rate 1/T) at the output of a matched filter 31, the digital information sequence $\{y_k\}$ with D-transform $y(D)$ enters a PR linear equalizer 32 with transfer function $d(D)$. The coefficients $\{d_i\}$ of the PR equalizer 32 are optimized such that the overall transfer function, including channel 30 and matched filter 31, closely matches a desired PR transfer function $f(D)$ having appropriate nulls where the channel has spectral nulls and/or near nulls, i.e.

$$f(D) = \sum_{i=0}^{L} f_i D^i. \tag{1}$$

In the correlative coding literature the coefficients $\{f_i\}$ are usually restricted to integers with a greatest common divisor equal to one. Here we assume that the $\{f_i\}$ can take on any real value as is the case in generalized PR systems. The discrete time output sequence of the PR equalizer 32 is given by $$z(D)=x(D)f(D)+n(D), \tag{2}$$

where $n(D)$ represents the total distortion, i.e. the noise and residual interference components. The predictor 35, operating as a whitening filter, subsequently whitens and reduces the total distortion, and the resulting sequence, $$w(D)=x(D)f(D)+e(D), \quad (3)$$

hereinafter referred to as modified discrete time sequence, enters the partial-response Viterbi detector 33 which estimates the original, i.e. the transmitted digital information sequence x(D). The combination of the linear PR equalizer 32 with the noise predictor 35 is called a noise-predictive PR equalizer. Note that the sequence e(D) in (3), although white, is not necessarily Gaussian. In the following sections the zero-forcing and minimum mean square error (MMSE) noise-predictive partial-response equalization are described.

Zero-Forcing Formulation

Figure 1:
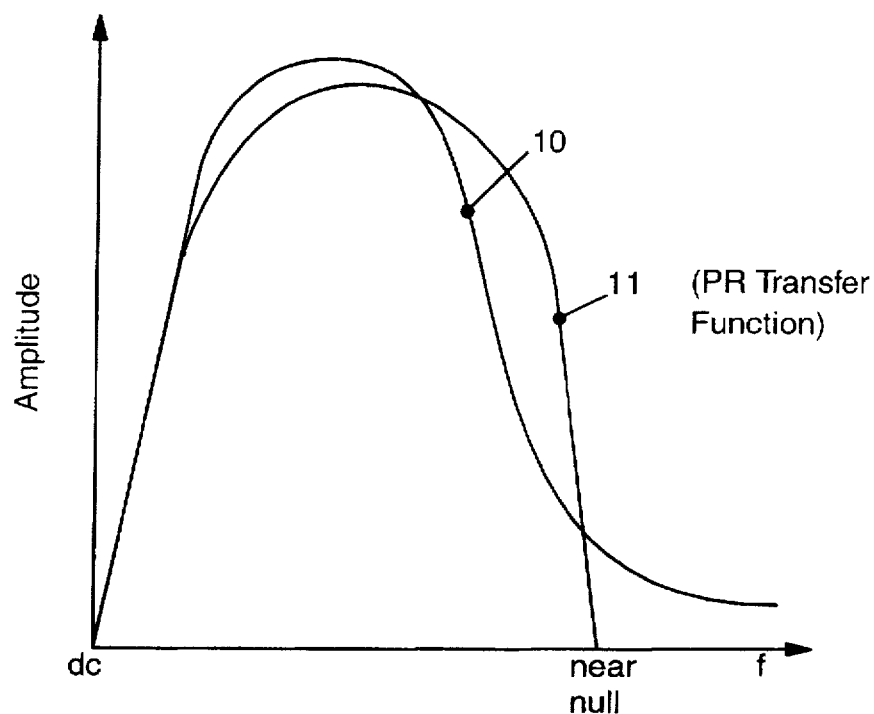
FIG. 1 shows the frequency response of a channel exhibiting a spectral null and a partial-response class-IV transfer function.
Figure 2:
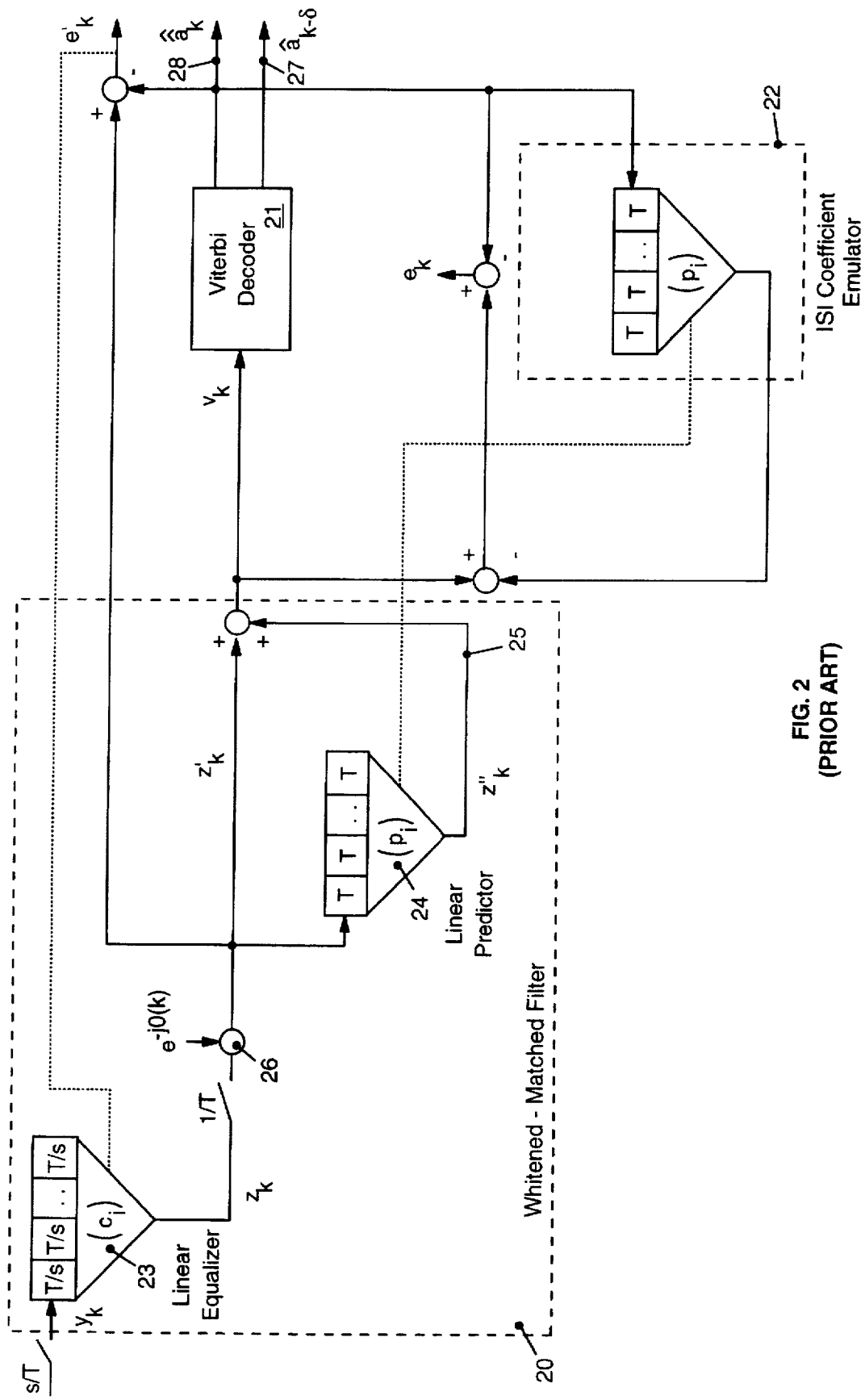
FIG. 2 shows a schematic block diagram of a fully adaptive modem receiver (Prior Art).

The coefficients of an infinitely long linear equalizer can be selected such that the overall impulse response at the output of this equalizer satisfies exactly the PR transfer function in (1). In other words the intersymbol interference (ISI) is restricted to a known amount that spans L symbol intervals and is zero elsewhere. The zero-forcing PR equalizer transfer function will then be $$d(D) = \frac{f(D)}{S_h(D)}, \quad (4)$$

where $S_h(D)$ is the D-transform of $R_h(k)$. The existence of nulls and/or near nulls in the channel frequency response (see curve 10 in FIG. 1) will be reflected in the PR transfer function (curve 11 in FIG. 1) by placing appropriate zeros in f(D). Equation (4) is still well defined by simply transferring the zeros from the matched filter 31, in FIG. 3, into the transfer function d(D) of the PR equalizer 32. For example, if the channel frequency response has an l-th order null at dc and an m-th order null at half the symbol frequency, then an appropriate selection is $f(D)=(1-D)^l(1+D)^m$. The cases l=m=1 and l=1, m=2 are of practical significance in wire transmission and magnetic recording. The first case is known in the technical literature as partial-response class-IV (PR-IV), whereas the latter case is known as extended partial-response class-IV (EPR-IV). In a zero-forcing formulation the sequence n(D) is a filtered version of the additive white Gaussian noise sequence. The autocorrelation function of n(D) is $$S_n(D) = \frac{f(D)f(D^{-1})}{S_h(D)} N_0. \quad (5)$$

The power of the noise sequence n(D) can be reduced by linear prediction. A linear predictor 35 with coefficients $\{q_i\}$ operating on the noise sequence n(D) will produce the estimate $\hat{n}(D)$, where the prediction-error sequence is given by $$e(D)=n(D)+\hat{n}(D)=n(D)(1+q(D)) \quad (6)$$

The optimum predictor $q(D)=q_1D+q_2D^2+\ldots$, which minimizes the mean-square error $\epsilon=E\{|e_k|^2\}$ is given by $q(D)=b(D)/b_0-1$, where b(D) is the minimum phase causal factor of $1/S_n(D)$. Assuming that f(D) is minimum phase, one readily finds that the minimum achievable mean-square error $\epsilon_{min}$ is given by $$\epsilon_{min} = \frac{1}{f_0^2}\exp\left\{\frac{1}{2\pi}\int_{-\pi}^{\pi} \ln\frac{N_0}{S_h(e^{j\omega})} d\omega\right\}. \quad (7)$$

For PR functions with $f_0=1$ which includes the important class $(1-D)^l(1+D)^m$, equation (7) reduces to an expression which is identical to the minimum mean-square error (MMSE) of a known infinitely long zero-forcing decision-feedback equalizer (DFE), as for example described in "Adaptive equalization", S. U. H. Qureshi, Proceedings of the IEEE, Vol. 73, No. 9, pp. 1349–1387, September 1985.

Minimum Mean-Square Error (MMSE) Formulation

The transfer function of an infinitely long PR linear equalizer based on the MMSE criterion is $$d(D) = \frac{\sigma_x^2 f(D)}{\sigma_x^2 S_h(D) + N_0}. \quad (8)$$

The sequence n(D) now represents the total distortion at the output of the PR equalizer 32. It consists of a filtered noise component and a residual interference component. It can be shown that the autocorrelation function of n(D) in the MMSE case is given by $$S_n(D) = \frac{\sigma_x^2 f(D) f(D^{-1})}{\sigma_x^2 S_h(D) + N_0} N_0. \quad (9)$$

Therefore, the MMSE predictor for the total distortion sequence n(D) is given by $q(D)=b(D)/b_0-1$, where $b(D)b(D^{-1})=1/S_n(D)$. Assuming now that f(D) is minimum phase, one finds $$\epsilon_{min} = \frac{1}{f_0^2}\exp\left\{\frac{1}{2\pi}\int_{-\pi}^{\pi} \ln\frac{\sigma_x^2 N_0}{\sigma_x^2 S_h(e^{j\omega}) + N_0} d\omega\right\}. \quad (10)$$

Clearly, for $f_0=1$ the expression for $\epsilon_{min}$ of an MMSE noise-predictive PR equalizer is identical to the MMSE of an infinitely long MMSE DFE, as for example described in the above mentioned article of S. U. H. Qureshi.

Note that in the MMSE formulation of the noise-predictive PR equalizer, selecting f(D) to have roots on the unit circle may yield a q(D) which is not realizable, i.e. its coefficients are not square-summable. This could occur even if the zeros of the PR transfer function f(D) are located at those frequencies where the channel has spectral nulls and/or near nulls. The non-square-summable condition can be eliminated by moving the zeros infinitely close to the unit circle.

Modified Sequence Estimator

It is clear from the discussion in the previous sections that an ideal noise-predictive PR equalizer (using perfect past decisions in the noise predictor) can decorrelate and significantly reduce the total distortion power at the input of the partial-response Viterbi detector 33. Unfortunately, zero-delay tentative decisions $\hat{x}(D)$ from the PR Viterbi detector 33, furnished at output 38, are usually unreliable in practical applications. Reliable operation of the noise-predictive PR equalizer is achieved by using decisions from the path memory of the PR Viterbi detector 33, i.e. by imbedding the prediction process into the PR Viterbi detector. The combination of the PR Viterbi detector 33, the partial response filter 34 with coefficients $\{f_i\}$, and the imbedded predictor 35 with coefficients $\{q_i\}$ is hereinafter called modified sequence estimator with PR Viterbi detector 36, as shown in FIG. 3.

Let $\mu_k=(x_{k-1}, x_{k-2}, \ldots, x_{k-L})$ at time k denote one of the $M^L$ possible states of the PR Viterbi detector 33. The modified sequence estimator with PR Viterbi detector 36 will then use the following branch metric associated with state $\mu_k$ $$\lambda_k(\mu_k) = \left| z_k + \sum_i q_i \left( z_{k-i} - \sum_{j=0}^{L} f_j \tilde{x}_{k-i-j}(\mu_k) \right) - \sum_{j=0}^{L} f_j \tilde{x}_{k-j} \right|^2 \quad (11)$$

where $\tilde{x}_{k-i-j}(\mu_k)$ denotes data symbol decisions taken from the path memory associated with state $\mu_k$. The second term on the right hand side of equation (11) is indicative of the prediction process imbedded into the PR Viterbi detector 33. Equivalently, the branch metric in (11) can be written as $$\lambda_k(\mu_k) = \left| w_k(\mu_k) - \sum_{j=0}^{L} f_j \tilde{x}_{k-j} \right|^2. \quad (12)$$

For notational simplicity, the sequences $\{\tilde{x}_k(\mu_k)\}$ and $\{w_k(\mu_k)\}$ are represented in FIG. 3 by $\tilde{x}(D)$ and $w(D)$, respectively. In FIG. 3, the dependency of the digital sequences $\{\tilde{x}_k\}$ (or $\tilde{x}(D)$) and $\{w_k\}$ (or $w(D)$) on the path memory associated with state $\mu_k$ is indicated by thick solid lines.

Having specified the new branch metric in (11) or (12), the modified sequence estimator with PR Viterbi detector 36 proceeds recursively as is described in the U.S. Pat. No. 5,031,195, with title "Fully Adaptive Modem Receiver Using Whitening Matched Filtering", issued 9 Jul. 1991.

Figure 4:
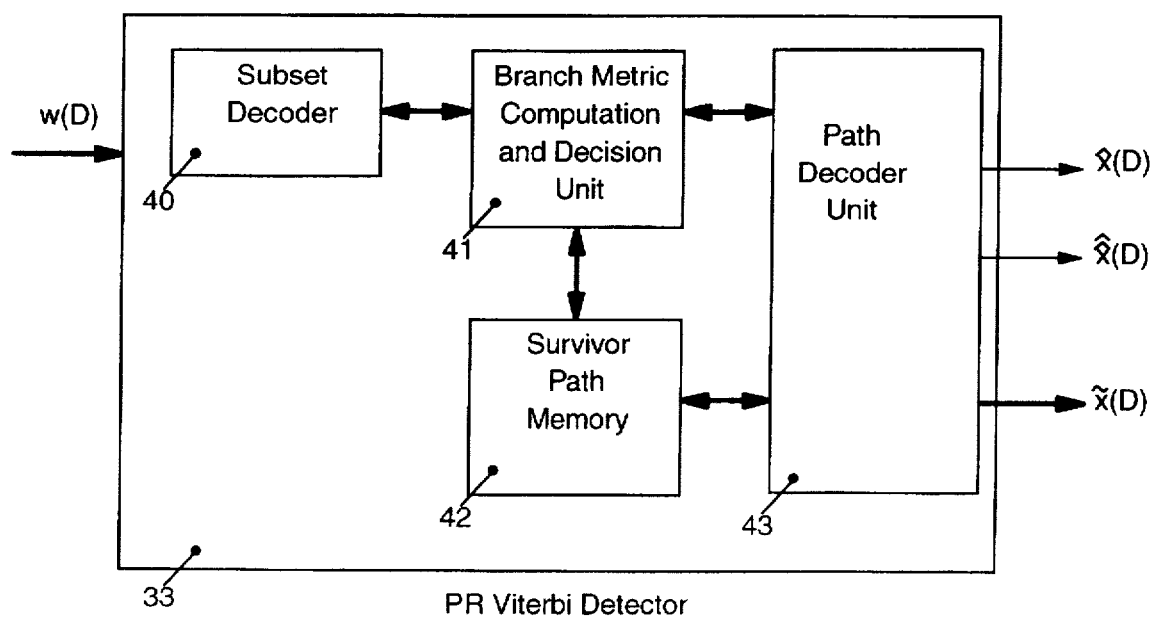
FIG. 4 shows a schematic block diagram of a partial-response Viterbi detector employed in the first embodiment.

A schematic diagram of the partial-response Viterbi detector 33 is shown in FIG. 4. This PR detector 33 comprises a subset decoder 40, a branch metric computation and decision unit 41, a survivor path memory 42, and a path decoder unit 43. These four units of the PR Viterbi detector 33 reflect that the detection process can, in general, be decomposed into four parts. For the magnetic recording channel where the signalling alphabet is restricted to be ±1, the subset decoder unit 40 can be omitted. In data transmission applications over wires where a multilevel signal alphabet is used, the subset decoder 40 offers a trade-off between performance and PR Viterbi detector state complexity.

For example, in quaternary 2B1Q (two binary, one quaternary), i.e. ±1, ±3, transmission over wires and PR class-IV ($f(D)=1-D^2$) shaping at the receiver a 16-state PR Viterbi detector is required. The PR Viterbi detector state complexity can be reduced by using the subset state concept as is described in U.S. Pat. No. 5,031,195. In this case, the PR Viterbi detector 33 operates on the 4-state subset trellis for a quaternary alphabet, shown in FIG. 6. The new branch metric for the modified sequence estimator with PR Viterbi detector 36 will then become $$\lambda_k(\mu_k) = \left| z_k + \sum_i q_i(z_{k-i} - \tilde{x}_{k-i}(\mu_k) + \tilde{x}_{k-i-2}(\mu_k)) - \tilde{x}_k(\mu_k) + \tilde{x}_{k-2}(\mu_k) \right|^2 \quad (13)$$

Implementation of Adaptive Receiver

In practical applications, the PR linear equalizer and noise predictor have finite lengths. For known channel characteristics the coefficients of a finite-length noise-predictive PR equalizer can be obtained by solving two sets of equations separately. In a first step the optimum coefficients of a finite-length PR linear equalizer are obtained. The predictor coefficients are then the solution of the well-known normal equations. The PR linear equalizer can be implemented as a T-spaced or fractionally-spaced equalizer. If the transmitter pulse shaping filter has excess bandwidth then a fractionally-spaced equalizer makes the receiver insensitive to the sampling phase. For unknown and slowly time-varying channels standard adaptation algorithms can be applied. The adaptation algorithms can operate in reference-directed or decision-directed mode.

Figure 5:
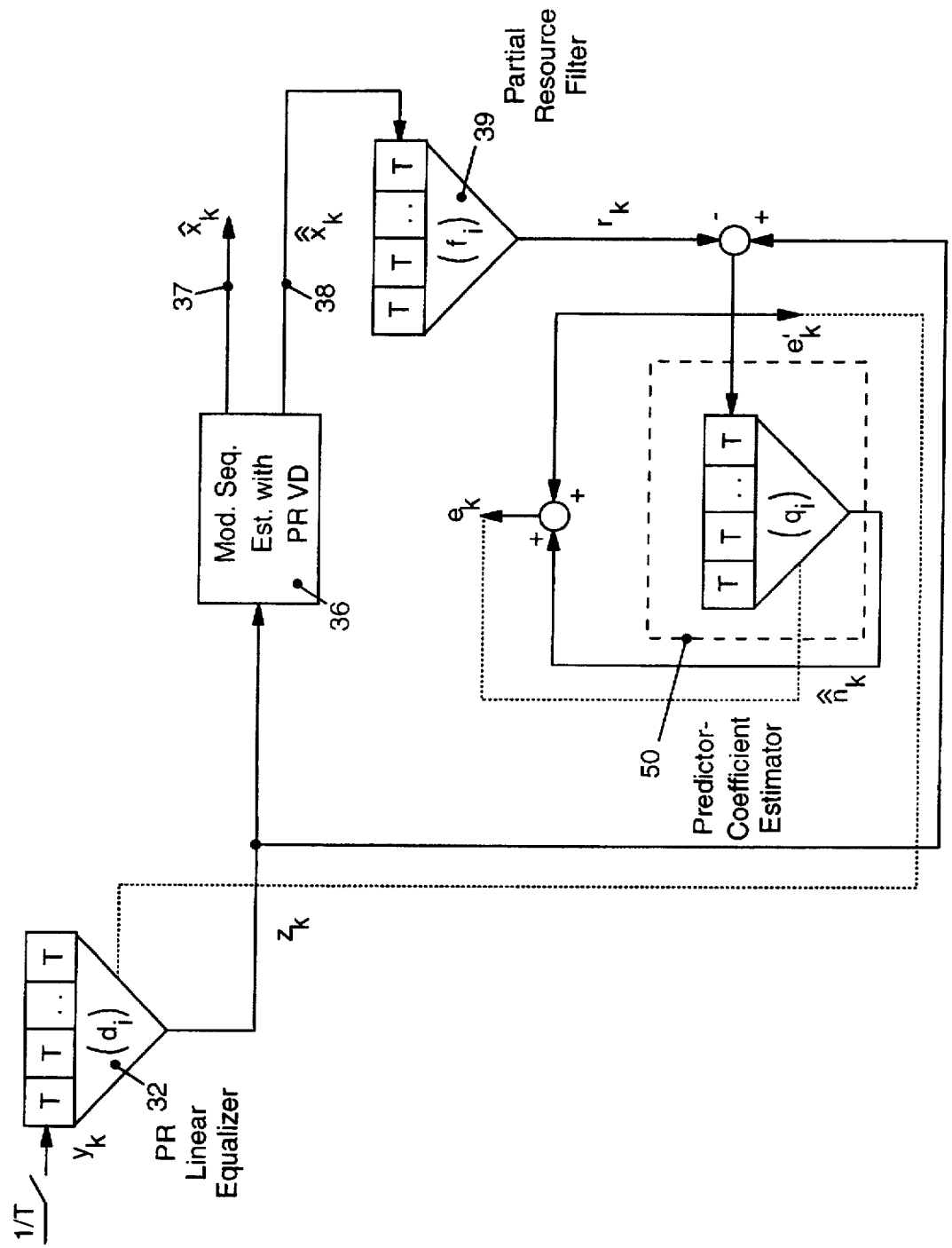
FIG. 5 shows an adaptive modem receiver based on the first embodiment
Figure 6:
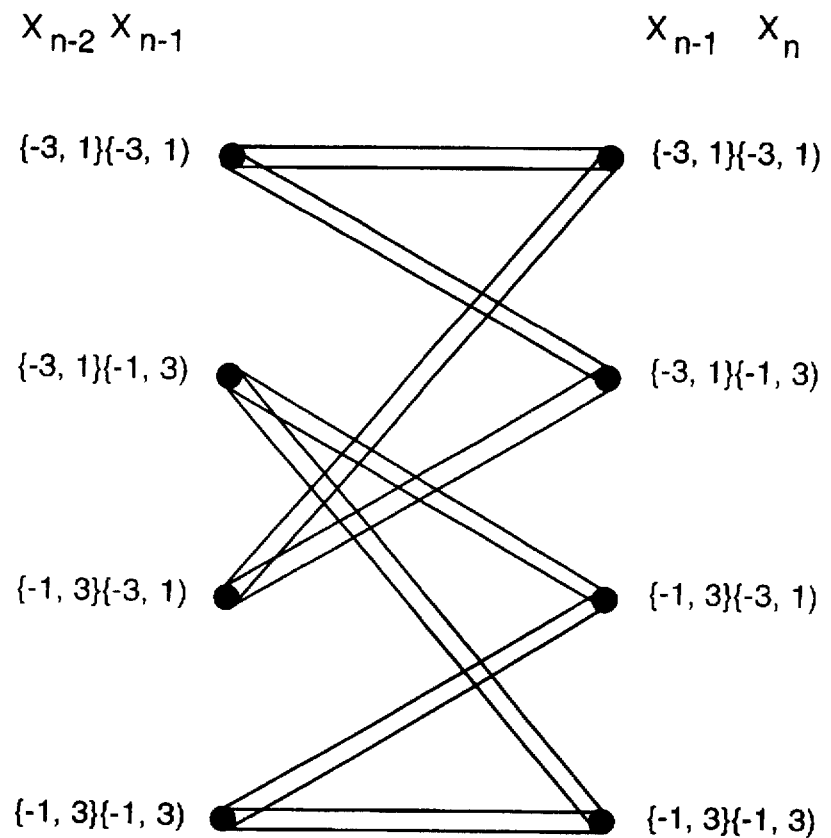
FIG. 6 shows an example of a 4-state subset trellis for a quaternary alphabet on which the PR Viterbi detector of the first embodiment operates.

An adaptive modem receiver based on the first embodiment is shown in FIG. 5. It consists of an MMSE linear partial-response equalizer 32 with T-spaced coefficients $\{d_i\}$ of plurality $N_1+1$, a predictor-coefficient estimator 50, a partial-response filter 39 with coefficients $\{f_i\}$ of plurality $L+1$, and a modified sequence estimator with PR Viterbi detector 36. After rate-1/T sampling at the output of the matched filter 31, see FIG. 3, the sequence of samples $\{y_k\}$, with D-transform $y(D)$, enters the equalizer 32. The partial-response equalized samples $z_k$ are then fed into the modified sequence estimator with PR Viterbi detector 36. The predictor-coefficient estimator 50 provides the set of predictor coefficients $\{q_i\}$ of plurality $N_2$ which will be used in the branch metric computation of the modified sequence estimator with PR Viterbi detector 36.

The partial-response equalizer 32 and the predictor-coefficient estimator 50 can be made adaptive using the error signal $$e_k' = z_k - r_k = z_k - \sum_{i=0}^{L} f_i \tilde{x}_{k-i} \quad (14)$$

for adjusting the PR equalizer coefficients $\{d_i\}$, and the prediction error $$e_k = e_k' + \sum_{i=L}^{N_2} q_i e'_{k-i} \quad (15)$$

for updating the predictor coefficients $\{q_i\}$. As indicated by the dashed lines in FIG. 5, the error signals $e_k$ and $e_k'$ are furnished to 32 and 50 for updating the coefficients. The symbols $\tilde{x}_k$ are either known reference symbols used during the training mode, or tentative decisions obtained from the modified sequence estimator with PR Viterbi detector 36 during the data transmission mode. Note that (15) describes the predictor operation as that of a whitening filter operating on the equalizer-error sequence $\{e_k'\}$. Thus, the PR equalizer 32 and predictor coefficient estimator 50 of the noise predictive PR equalizer in the first embodiment are adjusted according to the following gradient algorithms $$d_i(k+1) = d_i(k) - \alpha e_k' y_{k-i}, \; i=0, 1, \ldots, N_1 \quad (16)$$

$$q_i(k+1) = q_i(k) - \beta e_k(z_{k-i} - r_{k-i}), \; i=1, 2, \ldots, N_2, \quad (17)$$

where $\alpha$ and $\beta$ are adaptation parameters, and $r_k$ is defined in (14).

SECOND EMBODIMENT

In the following, a second embodiment of the present invention is described with respect to FIGS. 7 and 8. This embodiment is herein referred to as adaptive partial-response whitened matched filter (PR WMF) receiver. This receiver consists of a PR-WMF 82 followed by a modified sequence estimator with Viterbi detector 76. After matched filtering in 71 and sampling, a sequence of samples $\{y_k\}$, or equivalently in the D-transform domain $y(D)$, enters the linear PR equalizer 72 at a rate 1/T. The discrete time PR equalized sequence $z(D)$ is given by $$z(D) = x(D)f(D) + n(D), \quad (18)$$

where as before $n(D)$ represents the total distortion. The predictor 81, operating as a whitening filter, subsequently whitens the noise and the residual ISI components of the PR equalized sequence $z(D)$. In view of (6), (18) and the configuration in FIG. 7, the output sequence $v(D)$ can be written as $$v(D)=[x(D)f(D)+n(D)][1+q(D)]=x(D)f(D)+x(D)f(D)q(D)+e(D), \quad (19)$$

where e(D) is a white sequence. It can be seen that v(D) consists primarily of three components. A partial response component, an ISI component dependent on the predictor coefficients $\{q_i\}$ and finally, a white total distortion component. The ISI component is causal provided that the PR function f(D) is causal. The combination of the matched filter 71, PR equalizer 72, and the predictor 81 has been called PR-WMF 82. The PR-WMF output sequence v(D) enters into the modified sequence estimator with PR Viterbi detector 76. The PR Viterbi detector 73 operates on the PR trellis using the following branch metric $$\lambda_k(\mu_k) = \left| v_k - \sum_i q_i \sum_{j=0}^{L} f_j \tilde{x}_{k-i-j}(\mu_k) - \sum_{j=0}^{L} f_j x_{k-j} \right|^2. \quad (20)$$

where $\tilde{x}_{k-i-j}(\mu_k)$ denotes data symbol estimates taken from the path memory associated with state $\mu_k$. Equivalently, the branch metric in (20) can be written as $$\lambda_k(\mu_k) = \left| w_k(\mu_k) - \sum_{j=0}^{L} f_j x_{k-j} \right|^2. \quad (21)$$

Figure 7:
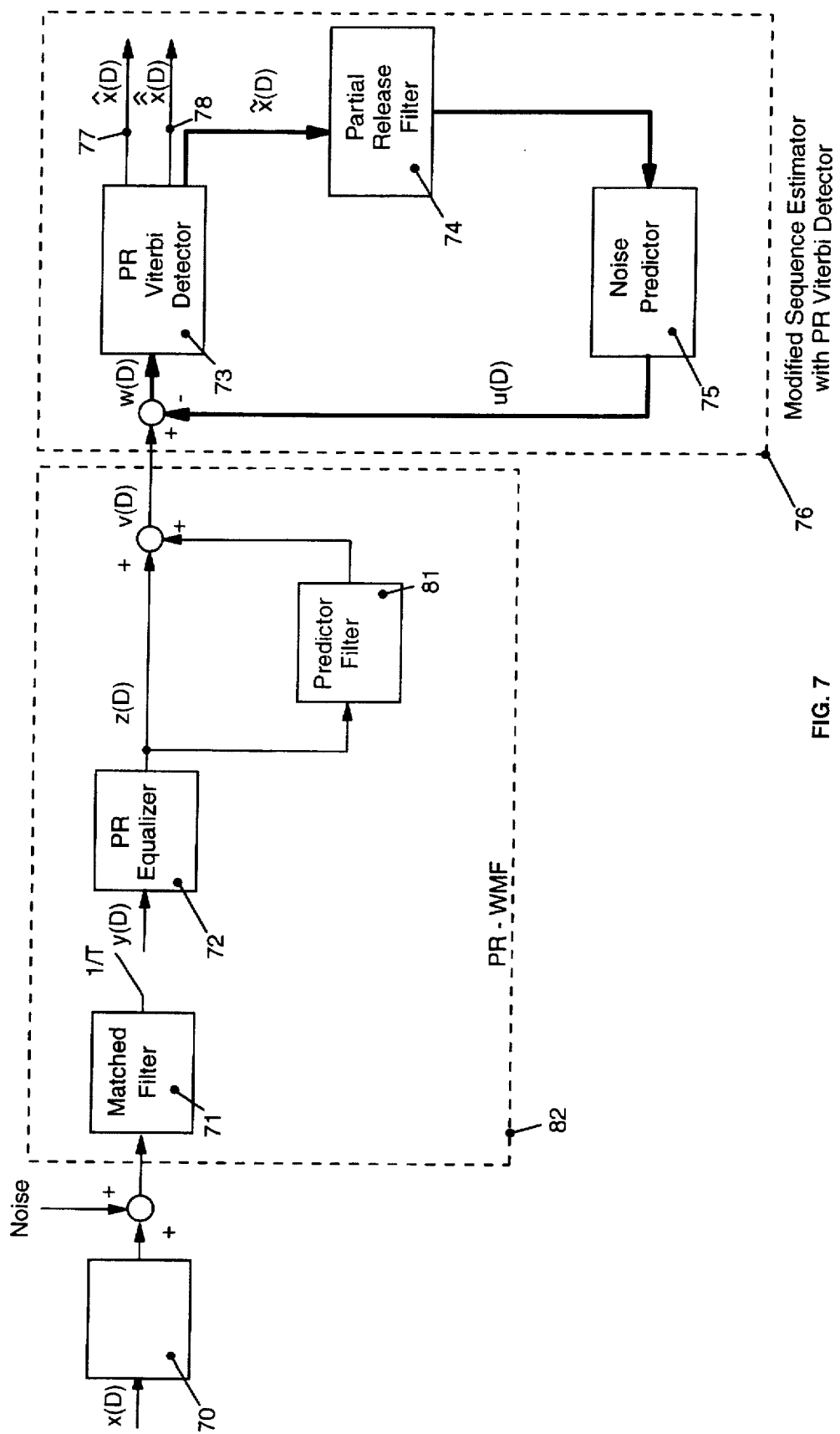
FIG. 7 shows a schematic block diagram of a data transmission system, in accordance with the second embodiment of the present invention.

For notational simplicity, the signals $\{\tilde{x}(\mu_k)\}$ and $\{w_k(\mu_k)\}$ are represented in FIG. 7 by $\tilde{x}(D)$ and w(D), respectively. In FIG. 7, the dependency of the digital sequences $\{\tilde{x}_k\}$ (or $\tilde{x}(D)$) and $\{w_k\}$ (or w(D)) on the path memory associated with state $\mu_k$ is indicated by thick solid lines. Having specified the branch metric in (20) or (21), the modified sequence estimator with PR Viterbi detector 76 operates as has been described in the first embodiment.

Figure 8:
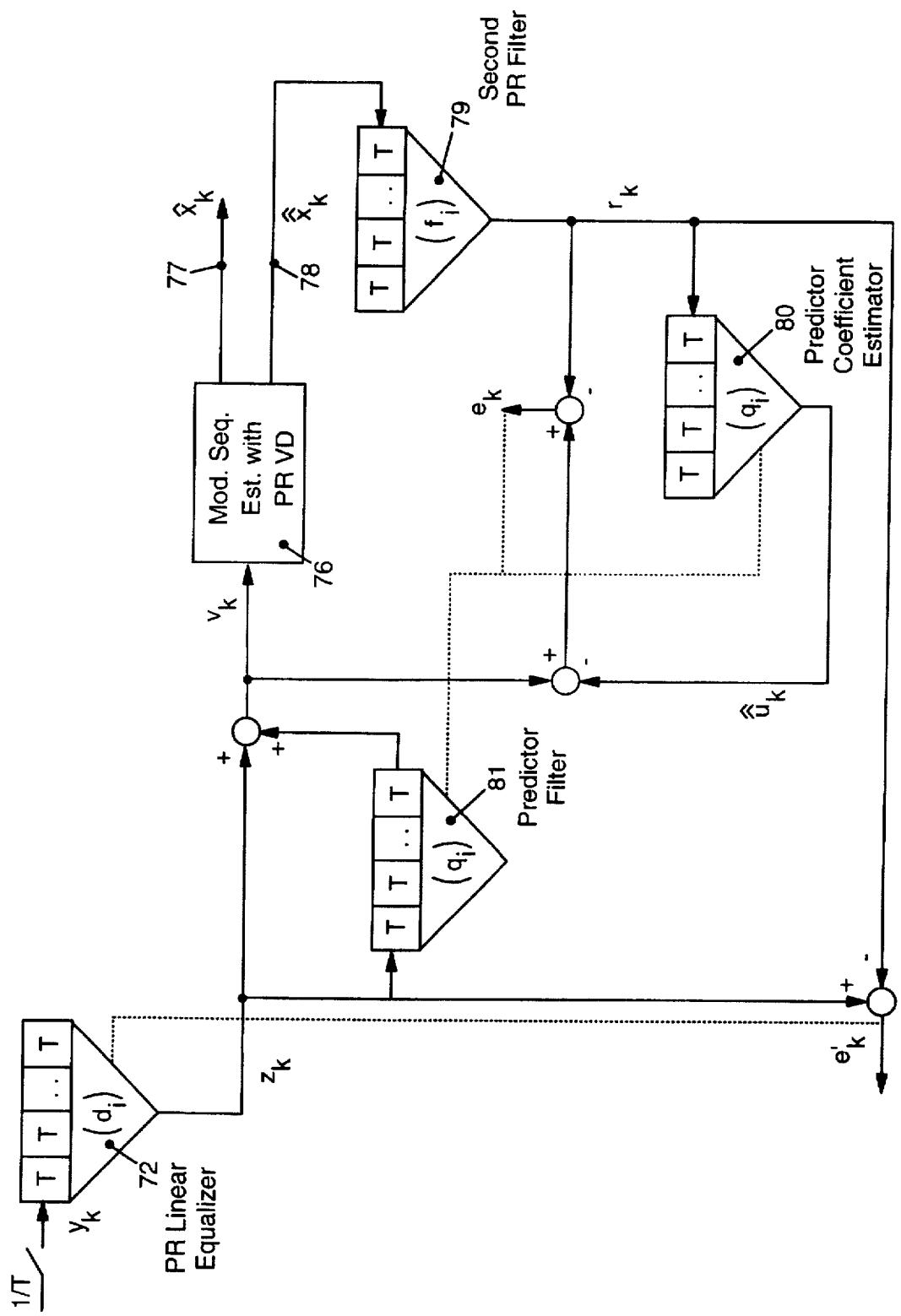
FIG. 8 shows an adaptive modem receiver based on the second embodiment

An adaptive modem receiver based on the second embodiment is shown in FIG. 8. It consists of an MMSE linear partial-response equalizer 72 with T-spaced coefficients $\{d_i\}$ of plurality $N_1+1$, a predictor filter 81 with coefficients $\{q_i\}$ of plurality $N_2$, a predictor-coefficient estimator 80 with coefficients $\{q_i\}$ of plurality $N_2$, a partial-response filter 79 with coefficients $\{f_i\}$ of plurality L+1, and a modified sequence estimator with PR Viterbi detector 76.

Once per symbol interval, the output values of equalizer 72 and predictor 81 are added, which yields the output sequence $$v_k = z_k + \sum_{i=1}^{N_2} q_i z_{k-i} = \sum_{i=0}^{N_1} d_i y_{k-i} + \sum_{i=1}^{N_2} q_i z_{k-i}. \quad (22)$$

The output of the PR filter 79 is given by $$r_k = \sum_{i=0}^{L} f_i \hat{x}_{k-i}, \quad (23)$$

and the output of the predictor 80 by $$\hat{u}_k = \sum_{i=1}^{N_2} q_i r_{k-i}. \quad (24)$$

If the transmission channel is unknown and slowly time varying, then standard adaptation algorithms can be applied. The PR-WMF receiver of the second embodiment can be made adaptive, e.g., by adjusting the coefficients $\{d_i\}$ of the equalizer 72 and the coefficients $\{q_i\}$ of the predictors 80 and 81 with the following gradient algorithms $$d_i(k+1)=d_i(k)-\alpha e_k' y_{k-i}, \quad i=0, 1, \ldots, N_1 \quad (25)$$

$$q_i(k+1)=q_i(k)-\beta e_k(z_{k-i}-r_{k-i}), \quad i=1, 2, \ldots, N_2, \quad (26)$$

where $\alpha$ and $\beta$ are adaptation parameters, and $r_k$ is given by (23). The corresponding error signals are $$e_k'=z_k-r_k \quad (27)$$

for updating the coefficients $\{d_i\}$ of the equalizer 72, and $$e_k=v_k-\hat{u}_k-r_k \quad (28)$$

for adjusting the coefficients $\{q_i\}$ of the predictors 80 and 81.

Using the above embodiments in wire transmission applications the whitening of the total distortion and the improved signal-to-noise ratio (SNR) lead to an increase in distance over which reliable transmission can be achieved and/or an increase in data transmission speed. In particular, for ISDN basic rate transmission the present scheme offers the following benefits:

improved robustness in the presence of noise and near-end crosstalk interference, more reliable operation on subscriber lines with bridged taps, and increased percentage of coverage in the subscriber loop plant.

Figure 9:
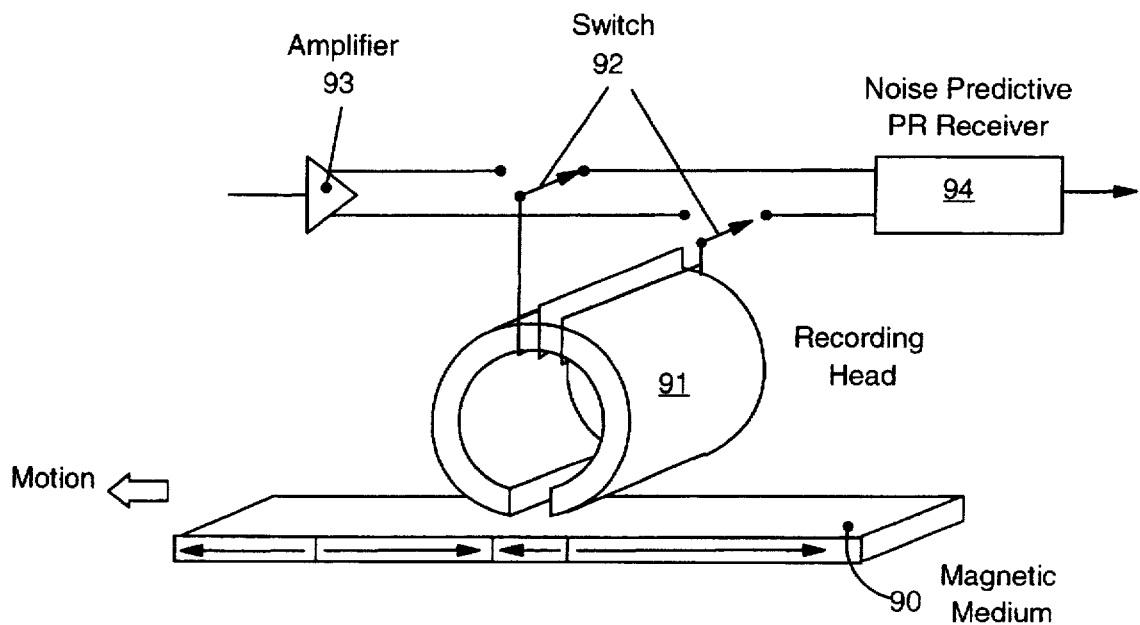
FIG. 9 shows a schematic diagram of a magnetic recording system.

The present adaptive noise-predictive partial-response equalization scheme can also be used in magnetic recording systems. This further embodiment of the present invention is schematically illustrated in FIG. 9. The present noise predictive partial response receiver with PR Viterbi detector, depicted by reference number 94, is made part of a magnetic recording system. When employing the receiver of the first embodiment, box 94 comprises the matched filter 31, the partial-response equalizer 32, and the modified sequence estimator with PR Viterbi detector 36. In case that the receiver of the second embodiment is used, box 94 comprises the modified sequence estimator with PR Viterbi detector 76 and the PR-WMF 82. Note that due to the fact that the signalling alphabet of the magnetic recording channel is restricted to be ±1, the subset decoder unit 70, shown in FIG. 4, is not needed. This system further comprises a magnetic medium 90, for example a magnetic disk, a read/write magnetic head 91, switching means 92 for switching from the write mode to the read mode and vice versa, and a amplifying means 93. The frequency response of this magnetic recording system is similar to the frequency response 10 shown in FIG. 1. The magnetic head 91 transmits no dc, and the channel has a near null at high frequencies. When employing the inventive equalization scheme in the receiver 94, the areal storage density can be increased.

A further advantage of the present scheme is that the noise predictor, imbedded in the PR Viterbi detector, can be piggybacked on existing PR systems to enhance performance such that no further hardware changes are necessary.

When the present invention is employed in a system where encoded digital information sequences are transmitted via the channel, then the PR Viterbi detector 33 in the first embodiment or 73 in the second embodiment operates on a trellis which encompasses in addition the state space defined by the encoder. Combined PR and code trellis examples can be found in the article "Trellis Coding for Partial-Response Channels", J. K. Wolf et al., IEEE Transactions on Communications, Vol. COM-34, No. 8, pp. 765–773, August 1986.

We claim:

1. An apparatus for detecting a digital information sequence x(D) transmitted via a channel exhibiting spectral nulls and/or near nulls, said apparatus comprising:

a partial-response linear equalizer (32; 72) having a transfer function d(D) for shaping said channel to a desired partial-response transfer function such that the discrete time output sequence z(D), at an output of said partial-response linear equalizer (32; 72), has spectral nulls approximately where the channel response has spectral nulls and/or near nulls, a modified sequence estimator (36; 76) which comprises:

a partial-response Viterbi detector (33; 73) estimating said transmitted digital information sequence x(D) and providing zero-delay tentative decisions $\hat{x}(D)$ at an output line (38; 78), and a partial-response filter (34; 74) followed by a noise predictor (35; 75) being connected to said partial-response Viterbi detector (33; 73) to isolate noise components and residual interference components of said discrete time output sequence z(D) and to predict future noise components and residual interference components, said apparatus being made adaptive by means of a second partial-response filter (39; 79) and a predictor-coefficient estimator (50; 80) having coefficients associated therewith, said second partial-response filter operating on said zero-delay tentative decisions $\hat{x}(D)$ to provide a shaped output sequence $\{r_k\}$ which is subtracted from said discrete time output sequence z(D) to obtain an error sequence $\{e'_k\}$ used for updating coefficients $\{d_i\}$ of said partial-response linear equalizer (32; 72).

2. The apparatus of claim 1, wherein said shaped output sequence $\{r_k\}$ is subtracted from said discrete time output sequence z(D) prior to being used as input to said predictor-coefficient estimator (50) which provides an output sequence $\{\hat{n}_k\}$ which is used for the generation of an error sequence $\{e_k\}$ by subtracting said error sequence $\{e'_k\}$ from said output sequence $\{\hat{n}_k\}$, said error sequence $\{e_k\}$ being employed for updating the coefficients $\{q_i\}$ of said predictor-coefficient estimator (50).

3. The apparatus of claim 1, wherein the coefficients $\{d_i\}$ of said partial-response linear equalizer (32; 72) are optimized such that the overall transfer function including said channel closely matches a desired partial-response transfer function.

4. The apparatus of claim 1, wherein the coefficients $\{f_i\}$ of said second partial response filter (39; 79) can take on any real values.

5. The apparatus of claim 1, comprising a predictor filter (81) operating as a whitening filter coupled to an output of said partial-response linear equalizer (72) such that said discrete time output sequence z(D) of said partial-response linear equalizer (72) and an output sequence of said predictor filter (81) are added to form a whitened sequence v(D) being forwarded to said modified sequence estimator.

6. The apparatus of claim 1, wherein said shaped output sequence $\{r_k\}$ is further used as input to said predictor-coefficient estimator (80) providing an output sequence $\{\hat{n}_k\}$ which is used for the generation of an error sequence $\{e_k\}$ by subtracting the output sequence $\{\hat{n}_k\}$ and said shaped output sequence $\{r_k\}$ from the whitened sequence $\{v_k\}$, said error sequence $\{e_k\}$ being employed for updating the coefficients $\{q_i\}$ of said predictor-coefficient estimator (80).

7. The apparatus of claim 6, wherein said second error sequence $\{e_k\}$ is employed for updating the coefficients $\{q_i\}$ of said predictor filter (81).

8. The apparatus of claim 1, wherein said transmitted digital information sequence x(D) is redundantly encoded and said partial-response Viterbi detector comprises means for exploiting that redundancy at the Viterbi detector.

9. A data transmission system or magnetic recording system comprising the apparatus of claim 1.

10. A method for detecting a digital information sequence x(D) transmitted via a channel exhibiting spectral nulls and/or near nulls, said apparatus comprising:

shaping said channel to a desired partial-response transfer function using a partial-response linear equalizer (32; 72) having a transfer function d(D) such that the discrete time output sequence z(D), at an output of said partial-response linear equalizer (32; 72), has spectral nulls approximately where the channel response has spectral nulls and/or near nulls;

estimating said transmitted digital information sequence x(D) and providing zero-delay tentative decisions $\hat{x}(D)$ at an output line (38; 78) using a partial response Viterbi detector (33; 73);

isolating noise components of said discrete time output sequence z(D) using a partial-response filter (34;74) followed by a noise predictor (35; 75) being connected to said partial-response Viterbi detector (33; 73);

isolating residual interference components of said discrete time output sequence z(D) using said partial-response filter (34;74) followed by said noise predictor (35; 75) being connected to said partial-response Viterbi detector (33; 73);

predicting future noise components and residual interference components using said partial-response filter (34; 74) followed by said noise predictor (35; 75) being connected to said partial-response Viterbi detector (33; 73); and adapting said method by using a second partial-response filter (39; 79) and a predictor-coefficient estimator (50; 80) having coefficients associated therewith, said second partial-response filter operating on said zero-delay tentative decisions $\hat{x}(D)$ to provide a shaped output sequence $\{r_k\}$ which is subtracted from said discrete time output sequence z(D) to obtain an error sequence $\{e'_k\}$ used for updating coefficients $\{d_i\}$ of said partial-response linear equalizer (32; 72).

* * * * *